Sept. 18, 1923.

J. C. MacLACHLAN 1,468,119

DEVICE FOR REDUCING LIQUIDS TO POWDERED OR OTHER CONDENSED FORM

Filed March 29, 1920

INVENTOR.
JOHN C. MACLACHLAN.
BY HIS ATTORNEYS.

Patented Sept. 18, 1923.

1,468,119

UNITED STATES PATENT OFFICE.

JOHN C. MacLACHLAN, OF ST. PAUL, MINNESOTA, ASSIGNOR TO STANDARD FOOD PRODUCTS COMPANY, OF ST. PAUL, MINNESOTA, A CORPORATION OF DELAWARE.

DEVICE FOR REDUCING LIQUIDS TO POWDERED OR OTHER CONDENSED FORM.

Application filed March 29, 1920. Serial No. 369,592.

*To all whom it may concern:*

Be it known that I, JOHN C. MACLACHLAN, a citizen of the United States, residing at St. Paul, in the county of Ramsey and State of Minnesota, have invented certain new and useful Improvements in Devices for Reducing Liquids to Powdered or Other Condensed Form; and I do hereby declare the following to be a full, clear, and exact description of the invention, such as will enable others skilled in the art to which it appertains to make and use the same.

My present invention has for its object to provide a simple and efficient device for reducing to dry powdered form substances, such as eggs, milk, and the like, that contain fat globules that should not be broken in the process of reduction to the powdered or condensed form.

In the reduction of certain kinds of liquids, or semi-liquids to dry powdered or granular form, a beating action is highly desirable, but in reducing whole milk or cream, or eggs to dry powdered form, the beating action will break up the globules, so that the product will be of a very inferior quality. The reduction of these fat containing substances to dry powdered form, must therefore, be accomplished without breaking the fat globules; and I have found that this may be effectually accomplished in the presence of a hot drying medium, such as hot air by violently throwing the fluid or semi-fluid substance and projecting the same at high velocity against or through a strong blast of air. The substance thus projected should be thrown outward in the form of a very thin or attenuated sheet, and the strong blast of air should come into contact therewith the very instant that the sheet is projected and should continue action on the sheet long enough to effect the reduction thereof, nearly or quite to dry powdered form.

The device for accomplishing the above result is in the form of a sprayer head and blower which should be arranged to rotate on a vertical axis at the top or in the upper portion of a chamber through which the hot air or drying medium is passed or circulated. By rotating the sprayer head in one direction and the fan or blower in the opposite direction, I double up the relative speed of rotation of one in respect to the other, so that the air blast will cut through the umbrella-like shower of sheet of the substance subjected from the sprayer head with a very greatly intensified action that is very effective in accomplishing the quick reduction of the material to dry powdered form.

The invention is illustrated in the accompanying drawings wherein like characters indicate like parts throughout the several views.

Referring to the drawings.

Figure 1:
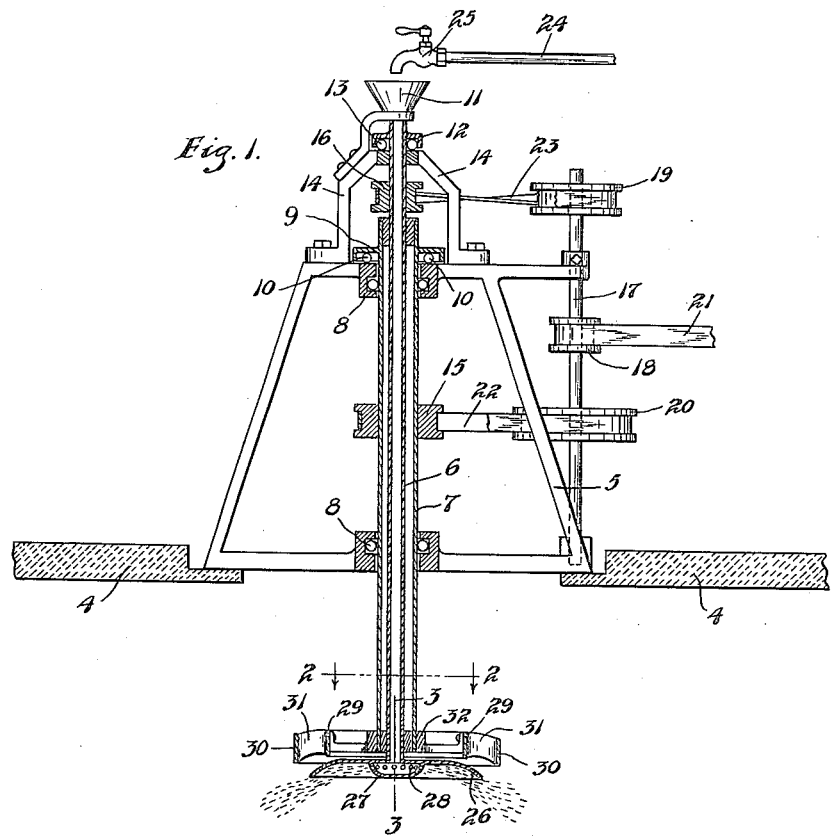
Fig. 1 is a vertical section with some parts broken away illustrating my invention.
Figure 2:
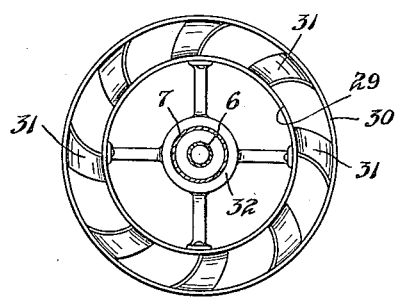
Fig. 2 is a horizontal section on the line 2—2 of Fig. 1.
Figure 3:
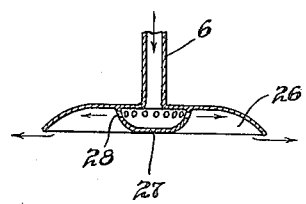
Fig. 3 is a vertical section through the sprayer head on the line 3—3 of Fig. 1.

As already stated, the combined sprayer head and blower is arranged to work in the upper portion of a large chamber, in or through which hot air is circulated. This chamber is indicated by the numeral 4, the top only thereof being shown in Fig. 1.

The numeral 5 indicates a pedestal-like frame secured on the top of the chamber 4. The numerals 6 and 7 indicate, respectively, concentrically arranged inner and outer tubular spindles, the former of which projects through the latter, both at its upper and lower ends. The outer spindle 7 is journaled in vertically spaced anti-friction or ball bearings 8 on the frame 5, and at its upper end, said spindle 7 is provided with an outstanding thrust flange 9, between which and the top of the upper bearing 8, balls 10 are arranged to run. At its projected upper end, the inner spindle 6 is provided with a funnel or flaring head 11, and below said funnel, is provided with an outstanding thrust flange 12. Bearing balls 13 are interposed between the thrust flange 12 and the top of a bearing yoke 14 that is secured on the frame 5. Said inner spindle 6 is also journaled in bearings at the upper and lower ends of the outer spindle 7. The outer spindle 7 is provided with a pulley 15 and the inner spindle 6, above the upper end of the spindle 7, is provided with a pulley 16.

The numeral 17 indicates an upright countershaft journaled in bearings on the frame 5 and provided with three pulleys, 18, 19 and 20. A power driven belt 21 runs over the pulley 18 to impart rotation to the shaft 17. A belt 22 runs over the pulleys 15 and 20 to transmit rotation to the outer spindle 7. A cross belt 23 runs over the pulleys 16 and 19 to impart rotation to the inner spindle 6. Here, it is important to note that by the arrangement of the belts 22 and 23, the latter being a cross belt, the two spindles 6 and 7 will, from the shaft 17, be simultaneously rotated in opposite directions. The substance to be reduced to powdered form, and which, will usually be in heavy liquid form, may be delivered to the funnel 11, and thence to the inner spindle 6, through a pipe 24 shown as equipped with a faucet 25.

The spraying head is applied to the lower end of the inner spindle 6, and as preferably constructed, comprises an outstanding spreader plate 26 that is made concavo-convex, so that its rim portion is concave on its lower side, or in other words, is turned downward. This deflecting plate 26 is of disk-like form and is rigidly secured to the spindle 6 so that it rotates therewith. The plate 26 is provided on its underside with a centrally located pocket 27 that receives the fluid substance to be condensed and powdered directly from the lower end of the spindle 6. This pocket 27 is provided with circumferentially spaced discharge perforations or passages 28 located in a plane close to the top of the spreader plate 26, so that the substance thrown outward therefrom by centrifugal force, will move directly against the concave lower surface of said plate 26.

The fan or blower is applied directly to the lower end of the outer spindle 7, and, as preferably constructed, it comprises a pair of concentric rings 29 and 30 and interposed oblique fan blades 31 connecting and spacing the said rings. The inner ring 29 is connected to the arms of a collar 32 that is secured to the extreme lower end of the spindle 7.

By reference to Fig. 1 it will be noted that the inner ring 29 is located inward, while the outer ring 30 is located outward of the outer edge of the concave deflecting plate 26, so that the fan blades 31 work directly over the outer edge of said deflecting plate and will throw downward a blast of air that will cut directly across the edge of said deflecting plate. This feature, coupled with the fact that the deflecting plate is rotated in one direction and the fan in the opposite direction, and that both are rotated at very high speed, to wit, from three to five thousand revolutions, each in its own direction, gives a tremendously high relative movement of the one in respect to the other, with a resulting cutting of the air blast through the attenuated fine sheet-like spray of the liquid to be powdered, and this insures rapid reduction of the substance to dry powdered form. Obviously, the heavy liquid material discharged from the passages 28 of pocket 27, under the action of centrifugal force, will, by the action of centrifugal force, be caused to spread out in a thin sheet against the entire under concave surface of the sprayer plate 26 with a result that the material thrown from the edge of the plate will be in a thin umbrella-like film, and hence, capable of quick and uniform reduction to fine powdered form by the action of the air blast in the presence of the hot drying medium. The efficiency of this device has been demonstrated in practice.

What I claim is:

1. In a device of the kind described, a sprayer head and a fan associated therewith, in combination with means for rotating said spraying head in one direction and said fan in the opposite direction, said sprayer head comprising a spreader plate against which the material to be desiccated is moved and from which it is projected by centrifugal force, and the said fan being arranged to discharge a blast of air directly against the outer edge of said spreader plate.

2. In a device of the kind described, a sprayer head and a fan associated therewith, in combination with means for rotating said spraying head in one direction and said fan in the opposite direction, said sprayer head comprising a tubular spindle serving as a delivery pipe for the material to be desiccated, a concave spreader plate secured to lower end of said tubular spindle, and a central pocket at the underside of said deflecting plate provided with circumferentially spaced discharge passages located in the plane above the outer edge of said deflecting plate.

3. In a device of the kind described, a sprayer head and a fan associated therewith, in combination with means for rotating said spraying head in one direction and said fan in the opposite direction, said sprayer head comprising a tubular spindle serving as a delivery pipe for the material to be desiccated, a concave spreader plate secured to the lower end of said tubular spindle, a central pocket at the underside of said deflecting plate provided with circumferentially spaced discharge passages located in the plane above the outer edge of said deflecting plate, and the said fan having blades that work immediately above the outer edge of said spreader plate and are arranged to deliver a downward blast against the same.

4. A device of the class described having in combination a conical disk against the concave surface of which the material is delivered, rotating means for creating a blast of air downwardly around the edge of said disk, and means for rotating said disk and said blast creating means in opposite directions.

5. In a device of the class described, rotating means for throwing material unobstructedly outwardly and downwardly in an umbrella-like shower, and oppositely rotating means located above said means for forcing a current of air downwardly through said shower.

6. A device of the class described having in combination a rotating spraying member having its undersurface concave, means for feeding material to said surface whereby said material will be thrown outwardly and downwardly, and a rotating fan located above said member and constructed and arranged to direct a current of air downwardly around said member.

7. In a device of the class described, centrifugal means for throwing material unobstructedly outwardly and downwardly in an umbrella-like shower and means located above said means for forcing an opposed current of fluid downwardly through said shower.

8. In a device of the class described, a centrifugal means for throwing material unobstructed outwardly and downwardly in an umbrella-like shower, and means for forcing an opposed current of fluid downwardly through said shower.

In testimony whereof I affix my signature.

JOHN C. MacLACHLAN.